(No Model.)

J. HODGESS.
SPRING SEAT FOR WAGONS.

No. 301,988. Patented July 15, 1884.

WITNESSES:
Francis McArdle
C. Sedgwick

INVENTOR:
J. Hodgess
BY
ATTORNEYS.

UNITED STATES PATENT OFFICE.

JOHN HODGESS, OF LOYALTON, CALIFORNIA.

SPRING-SEAT FOR WAGONS.

SPECIFICATION forming part of Letters Patent No. 301,988, dated July 15, 1884.

Application filed December 14, 1883. (No model.)

*To all whom it may concern:*

Be it known that I, JOHN HODGESS, of Loyalton, in the county of Sierra and State of California, have invented certain new and useful Improvements in Spring-Seats for Wagons and other Objects, of which the following is a full, clear, and exact description.

My invention relates to certain improvements in that class of spring-seats for vehicles which are provided with stay-bars passing through staples to prevent any lateral movement of said seat; and the invention consists in the construction and arrangement of the parts, as will be hereinafter fully described and claimed, reference being had to the accompanying drawings, forming part of this specification, in which—

Figure 1:
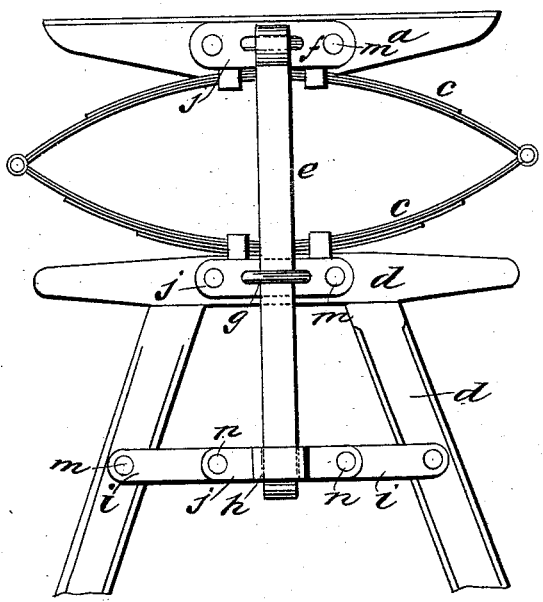
Figure 2:
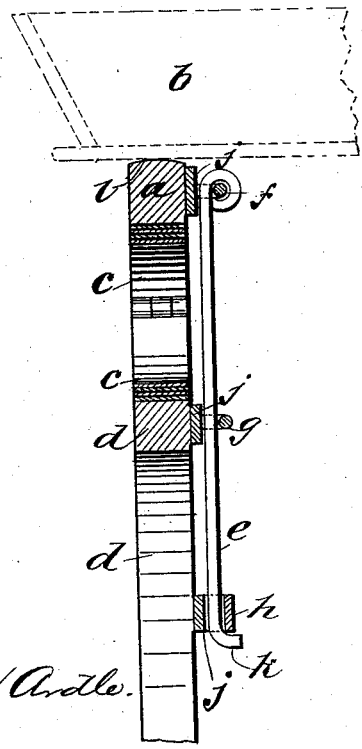

Figure 1 is a side elevation of the spring-support for the seat and the supporting-frame of the wagon-bed for the spring, and Fig. 2 is a transverse section of the same with the seat indicated in dotted lines.

*a* represents the bar on which one end of the seat *b* rests. This bar *a* is curved on its upper face, for a purpose to be hereinafter explained.

*c* represents the spring, and *d* the frame, of the vehicle bed or body for the support of the spring.

*e* is the stay-bar, loosely connected to the bar *a* by a staple, *f*, on plate *j*, which is secured to said bar by bolts *m*. The stay-bar passes down through keepers *g h* on plates *j*, which are secured by bolts *m n* to the frame *d* and cross-piece *i*. Below the cross-piece the stay-bar is bent to prevent the withdrawal of the same from the keepers *g h*. By rounding the upper surface of the bar *a* and forming a loose connection between said bar and the stay-bar a limited lateral movement is allowed the seat, which will have a slight rolling motion on the upper surface of the bars *a*. It will of course be understood that the above-described construction of bar, stay-bar, spring, &c., is to be used on each side of the wagon. The loose connection between the stay-bars and bars *a* and the rounding of the latter will serve also to prevent stay-bars from being bent or broken by any tendency of the seat to move in a lateral direction when the vehicle is passing over bad roads, and the seat will ride easier than where the stay-bars are immovably secured to the bars *a*, as has been done in some constructions.

The shape of the stay-bars may be round, oval, or flat, as may be desired.

The bolts *m*, by which the plates *i* and *j* are attached, are sometimes used in the common construction of these seats to prevent the bars from splitting, so that in such cases I only have to provide stay-bars *e*, staples *f*, keepers *g h*, lower plates, *j*, and bolts *n*, by which said lower plates, *j*, are attached, besides making the bolts *m* and *n* a little longer.

What I claim as new, and desire to secure by Letters Patent, is—

In a spring-seat, the combination of the springs *c* and bars *a*, rounded on their upper surfaces, with the stay-bars *e*, loosely connected to said bars *a*, and passing through suitable staples on frame *d* below the spring, and provided with means to prevent their withdrawal from said keeper, whereby the seat may have a slight lateral and rolling movement, substantially as set forth.

JOHN HODGESS.

Witnesses:
THOMSON F. BATTELLE,
CHARLES E. HORTON.